United States Patent [19]
Tuhro et al.

[11] Patent Number: 5,642,197
[45] Date of Patent: Jun. 24, 1997

[54] SYSTEM AND METHOD FOR ENHANCING COLOR SEPERATION UTILIZING MULTIPLE PASS SCANNER IN A SINGLE PASS COLOR SCANNER

[75] Inventors: Richard H. Tuhro, Webster; Joseph P. Tallie, Pittsford, both of N.Y.

[73] Assignee: Xerox Corporation, Stamford, Conn.

[21] Appl. No.: 534,759

[22] Filed: Sep. 27, 1995

[51] Int. Cl.⁶ .................................................. G01J 3/51
[52] U.S. Cl. ............................ 356/418; 250/226; 356/418
[58] Field of Search ................................... 356/418, 419; 250/226

[56] References Cited

U.S. PATENT DOCUMENTS

4,652,913  3/1987  Saitoh et al. ........................ 250/226 X

*Primary Examiner*—Vincent P. McGraw
*Attorney, Agent, or Firm*—Michael J. Nickerson

[57] ABSTRACT

A digital color scanner capable of high color quality includes a light source, a photosensor, a first color filter, a second color filter, a third color filter, and a fourth color filter. The first, second, and third color filters are positioned in an optical path between the light source and the photosensor so as to enable the photosensor to produce a first, second, and third set of color image data during a first calibration scan. The fourth color filter is moved into and out of the optical path between the light source and the photosensor so as to enable the photosensor to produce a fourth, fifth, and sixth set of color image data during a second calibration scan. A circuit produces a set of color correction values from the first, second, third, fourth, fifth, and sixth sets of color image data.

19 Claims, 5 Drawing Sheets

SYSTEM AND METHOD FOR ENHANCING COLOR SEPERATION UTILIZING MULTIPLE PASS SCANNER IN A SINGLE PASS COLOR SCANNER

FIELD OF THE PRESENT INVENTION

The present invention is directed to a system or method for enhancing color separation in a color scanner. More specifically, the present invention is directed to a system and method for augmenting the color filters of a conventional color scanner with additional filters so as to provide a better color representation of the image.

BACKGROUND OF THE PRESENT INVENTION

Figure 1:
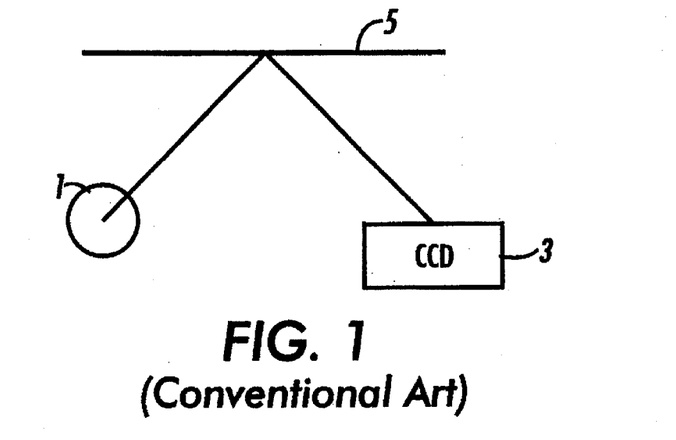
FIG. 1 is a block diagram illustrating the architecture of a conventional color scanner.

Conventionally, a color scanner, as illustrated in FIG. 1, includes a light source 1 which illuminates an image 5 such that the light incident upon the image is reflected down upon a CCD sensor or full width array 3 (hereinafter "sensor"). To obtain the color information of the image, conventional color scanners utilize a variety of different methods to separate the colors of the image.

Figure 2:
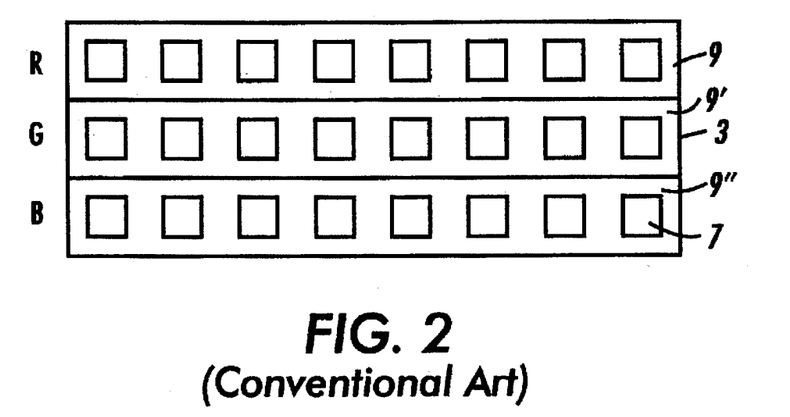
FIG. 2 illustrates a CCD sensor or full width array utilized in the conventional color scanner of FIG. 1.

For example, as illustrated in FIG. 2, the sensor 3 may have particular color filters positioned on it. As shown in FIG. 2, the sensor 3 has a row of pixels 7 over which a red filter 9 is placed. Next to this row of pixels having a red filter placed thereon, a second row of pixels 7 have a green filter 9' placed over them. Lastly, a third row of pixels 7 are situated such that a blue filter 9" is positioned over them. In other words, a conventional color scanner may utilize a sensor 3 which has three separate areas designated on the sensor for sensing particular colors of the image being scanned.

Figure 3:
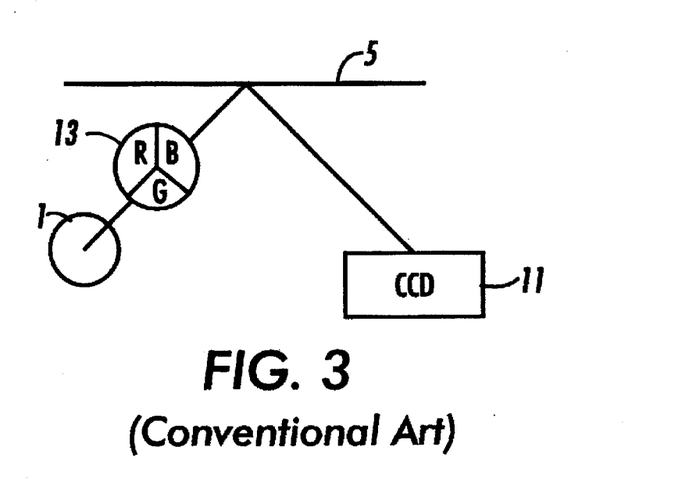
FIG. 3 is a block diagram illustrating a second type of conventional color scanner.

Another example of a conventional color scanner is illustrated in FIG. 3. In this example, a sensor 11 does not have any color filters placed above the individual photosites or pixels 7. To provide the proper color separation for scanning the image, a color wheel 13 is placed in the optical path between the light source 1 and the sensor 11. This color wheel contains three separate filters; red, green, and blue; which are rotated through the optical path to provide the proper color separation. It is noted, that this color wheel can be placed along any portion of the optical path to provide the proper color separation.

Figure 4:
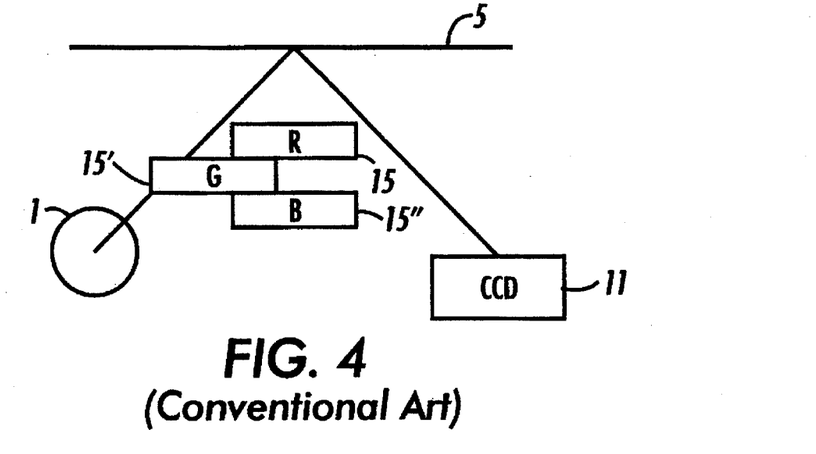
FIG. 4 is a block diagram illustrating a third type of conventional color scanner.

Lastly, a third example of a conventional color scanner is illustrated in FIG. 4. In this conventional color scanner, the red filter 15, green filter 15', and blue filter 15" are slid in and out of the optical path between the light source 1 and sensor 11. By sliding the red, green and blue filters (15, 15', and 15", respectively), in and out of the optical path between the light source 1 and sensor 11, this conventional color scanner can provide the necessary color separations to properly scan the image.

For color scanners to properly convert the color image to electronic signals, the color scanners need to simulate the color response of the human eye. This is conventionally done by scanning the color image with three separate color filters, normally red, green, and blue, as discussed above. However, since the color filters of a conventional scanner do not exactly match the spectral response of the human eye, only an imperfect conversion from this scanner output to a colormetric response (human eye) can be obtained.

For accurate color representation, it is necessary to have a color scanner with a color response that matches the human eye. If a color scanner can accurately match the color response of the human eye, the color scanner can create an electronic file that completely describes the color of an object as seen by the human eye. Thus, the image could be potentially reproduced accurately by a printer or display.

As noted above, the spectral response of the human eye cannot be exactly matched with the filters in a typical color scanner. More specifically, the conventional color scanner, in an attempt to match the spectral response of the human eye, performs a color transformation to map the information received from the three color scans to the three color sensitivities defined by the human eye. Although the conventional scanner attempts to match the spectral response of the human eye through the utilization of a color transformation scheme, a universal match is usually not achieved utilizing the three conventional scans performed by the conventional scanner because of the physical limitations of the utilized color filters.

To achieve a more accurate match between the spectral response of the color scanner and the spectral response of the human eye, the present invention utilizes an additional filter or filters placed in the optical path between the light source and the CCD sensor or full width array so as to increase the number of color samples (scans). By increasing the number of color samples (scans) for a particular image, the color scanner can more accurately match the spectral response of the human eye.

SUMMARY OF THE PRESENT INVENTION

One aspect of the present invention is a method for performing a color scan. The method scans a color original utilizing a set of color filters and generates a first set of color image data. The method then scans the color original utilizing the set of color filters with an additional color filter inserted into an optical path between a source of illumination and a photosensor and generates a second set of color image data. The method produces a set of color corrected values from the first and second set of color image data.

Another aspect of the present invention is a digital color scanner. The scanner includes a light source; a photosensor; a first color filter; a second color filter; a third color filter; and a fourth color filter. The first, second, and third color filters are positioned in an optical path between the light source and the photosensor so as to enable the photosensor to produce a first, second, and third set of color image data during a first scan. The fourth color filter is moved into the optical path between the light source and the photosensor so as to enable the photosensor to produce a fourth, fifth, and sixth set of color image data during a second scan.

A third aspect of the present invention is a digital color scanner capable of changing color quality. The scanner includes a user interface for selecting a color quality; a light source; a photosensor; a first color filter; a second color filter; a third color filter; and a fourth color filter. The first, second, and third color filters are positioned in an optical path between the light source and the photosensor so as to enable the photosensor to produce a first, second, and third set of color image data during a first scan. The fourth color filter is moved into the optical path between the light source and the photosensor so as to enable the photosensor to produce a fourth, fifth, and sixth set of color image data during a second scan. The scanner further includes means for producing a set of corrected color values from the first, second, third, fourth, fifth, and sixth sets of color image data.

Further objects and advantages of the present invention will become apparent from the following description of the various features of the present invention.

BRIEF DESCRIPTION OF THE DRAWINGS

The following is a brief description of each drawing used in describing the present invention, and thus, the drawings are being presented for illustrative purposes only and should not be limitative of the scope of the present invention, wherein.

DETAILED DESCRIPTION OF THE PRESENT INVENTION

For a general understanding of the various features of the present invention, reference is made to the drawings. In the drawings, and in the description below, like reference numerals are used throughout to designate identical or equivalent elements or status.

Figure 5:
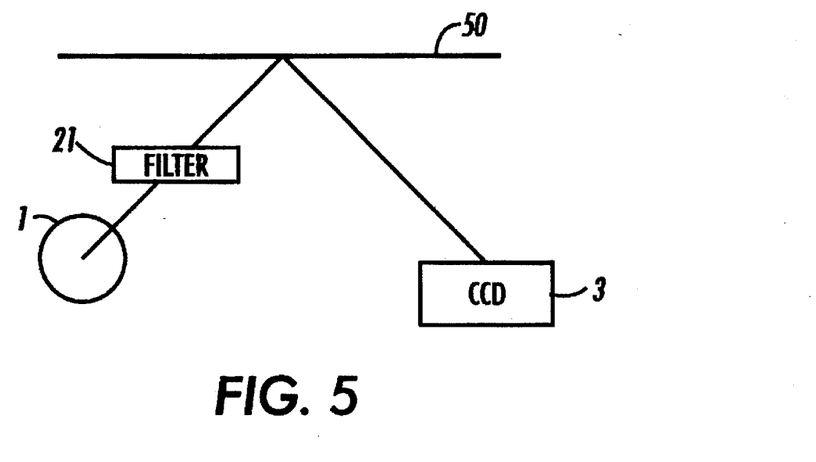
FIG. 5 is a block diagram illustrating a color scanner according to one embodiment of the present invention.

FIG. 5 illustrates one embodiment of the present invention which utilizes an additional filter so as to provide additional color separation which enhances the ability to map the color scanner signals to a corrected color space. As illustrated in FIG. 5, an additional filter 21 is placed in the optical path between a light source 1 and a CCD sensor or full width array 3 ("sensor 3"). In the embodiment, illustrated by FIG. 5, the sensor 3 has the filters as illustrated in FIG. 2.

It is noted that this additional filter does not remain in the optical path at all times. More specifically, an initial scan of a color original 50 would take place without the filter 21 residing in the optical path between the light source 1 and sensor 3. Subsequent to this first scan, a second scan of the color original 50 would be carried out. In the second scan, the filter 21 would be placed in the optical path between the light source 1 and sensor 3 by some method, such as a conventional electromechanical or electro-optical device.

The placing of the additional filter in the optical path between the light source 1 and sensor 3 enables the present invention to make additional scans, thereby obtaining additional color data with a further modified spectral response. This additional color data can then be used with the original scanned data (R, G, and B) to enhance the color data generated during the first scan sequence.

For example, if a scanner utilizes three sensor filters identified as red, green, and blue, by inserting an additional filter into the optical path during a second scan, this second scan would give modified combined filter responses for each of the colors red, green and blue (R', G', and B'). This information in conjunction with the original scan data of R, G, and B can be used to generate more accurate and robust corrected color values.

As noted above, the data obtained from the original scan are utilized to generate original color values represented in a corrected color space. For example, if the corrected color space is the XYZ color space, the original corrected color values can be obtained from a set of matrix equations as follows:

$$X = k_1 * R + k_2 * G + k_3 * B$$

$$Y = k_4 * R + k_5 * G + k_6 * B$$

$$Z = k_7 * R + k_8 * G + k_9 * B.$$

In other words, the color data RGB received from the sensor 3 can be converted to the corrected color space XYZ according to the matrix equations set forth above. The coefficients $k_1$ to $k_9$ are dependent upon the actual filters utilized by the color scanner as well as spectral characteristics of other optical components of the scanner and can be readily determined by those skilled in the art. As in the case for the embodiment illustrated by FIG. 5, the coefficients are defined by the filters positioned on the sensor 3. Thus, the red filter has associated therewith known $k_1$, $k_4$, $k_7$ coefficients, the green filter has associated therewith known $k_2$, $k_5$, $k_8$ coefficients, and the blue filter has associated therewith known $k_3$, $k_6$, $k_9$ coefficients. It is noted that the matrix equations described above are typical of the equations utilized in conventional scanners to convert the RGB data into a corrected color space.

The present invention then utilizes a second scan which includes an additional filter to obtain additional color information to enhance the ability of matching the color scanner signals to the corrected color space. The color data originating from the second scan can be converted to a corrected color space utilizing the following matrix equations:

$$X_f = k_1*R + k_2*G + k_3*B + k_{10}*R' + k_{11}*G' + k_{12}*B'$$

$$Y_f = k_4*R + k_5*G + k_6*B + k_{13}*R' + k_{14}*G' + k_{15}*B'$$

$$Z_f = k_7*R + k_8*G + k_9*B + k_{16}*R' + k_{17}*G' + k_{18}*B'.$$

Thus, the utilization of the additional filter in the second scan provides more information (R', G', and B') to more accurately calculate the XYZ values of the color space. The coefficients $k_{10}$ to $k_{18}$ are dependent upon the actual additional filter utilized in the second scan as well as the filters and optical components used in the first scan and can be readily determined by those skilled in the art.

In other words, by performing these two sets of scans, the color scanner can properly and accurately calculate the color image data so that the image can be accurately rendered by any printer or display. It is noted that the color correction factors used in processing these two scans can be applied anywhere in the image processing stream to correct for the color deficiencies in the color scanner. Specifically, the color correction factors may be applied within the scanner as the data is acquired, or the color correction factors may be applied by an external host computer, server, or other type of image processing module which may stand alone or be part of an integrated system upon completion of both scans.

Figure 6:
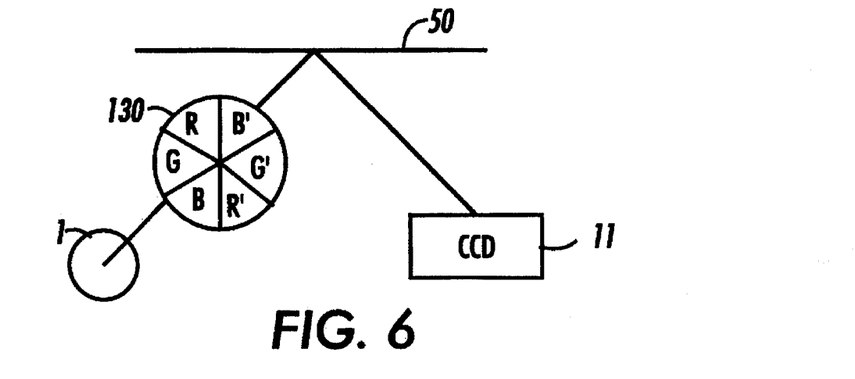
FIG. 6 is a block diagram illustrating a color scanner according to another embodiment of the present invention.

FIG. 6 illustrates another embodiment of the present invention which utilizes the concept of an additional filter. As illustrated in FIG. 6, a color wheel 130 has been modified to include six separate filter regions. Three of the filter regions, RGB, correspond to the filter regions typically found on a conventional color wheel. The three color filter regions, R', G' and B', correspond to the adding of the additional filter in the optical path. The embodiment illustrated in FIG. 6 includes a sensor 11 which does not include the filters illustrated in FIG. 2.

In this embodiment, the color filter region R' is made up of the same filter utilized in the R color region with an additional filter placed in the optical path. Moreover, the color filter region G' includes the same color filter as in the G filter region with the same additional filter laid upon it as utilized in the R' color filter region. This construction is also applicable to the B' color filter region.

In this embodiment, the color wheel is rotated such that original scans are performed to gather each of the R, G, and B data and a second set of scans is performed to gather the R', G', and B' image data. The image data from these two scans are utilized in the same fashion as described above with respect to FIG. 5 to determine the corrected color values so that the spectral response of the color scanner can more exactly match the spectral response of the human eye.

Figure 7:
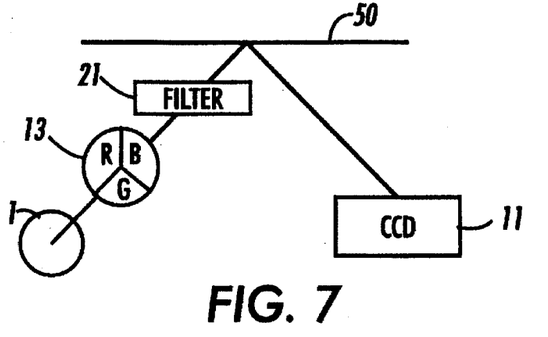
FIG. 7 is a block diagram illustrating a color scanner according to third embodiment of the present invention.

FIG. 7 illustrates a third embodiment of the present invention wherein an additional filter 21 is placed in the optical path between a light source 1 and sensor 11. This additional filter 21 is moved into and out of the optical path by utilizing a conventional electromechanical device so as to enable the color scanner to carry out a first scan to produce RGB data and to carry out a second scan to produce R', G', B' data. Again, the RGB and R', G', B' image data are utilized to determine the color correction values for the color scanner in the same manner described above with respect to FIG. 5.

Figure 8:
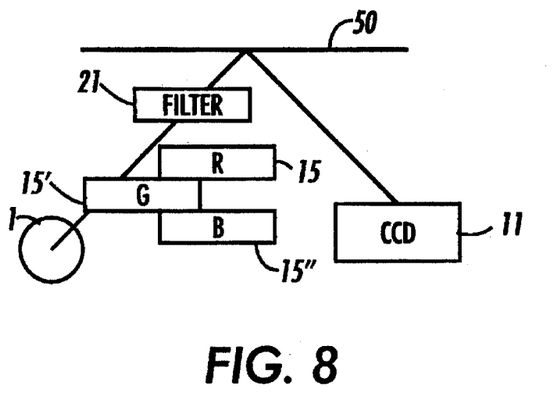
FIG. 8 is a block diagram illustrating a color scanner according to a fourth embodiment of the present invention.

FIG. 8 illustrates a fourth embodiment of the present invention which utilizes an additional filter that is placed in the optical path between the light source 1 and sensor 11. FIG. 8 illustrates the conventional color scanner of FIG. 4 which has been modified according to the concepts of the present invention. The filter 21 operates in the same manner as described above with respect to FIGS. 5 and 7.

In each of these embodiments, the function of the additional filter may be accomplished in one of several ways. As described above, the filter may be an actual optical filter that is mechanically inserted into and removed from the optical path between the light source and the image sensor. It could also be an electro-optical filter that remains in the optical path at all times. The filter's spectral transmittance would be changed through electronic control.

Figure 12:
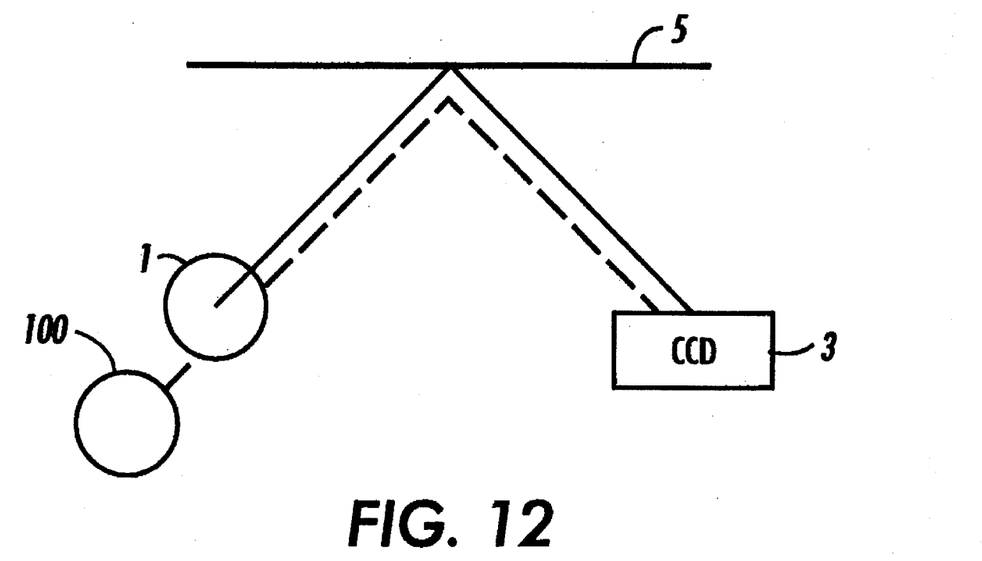
FIG. 12 is a block diagram illustrating a color scanner according to a fifth embodiment of the present invention.
Figure 13:
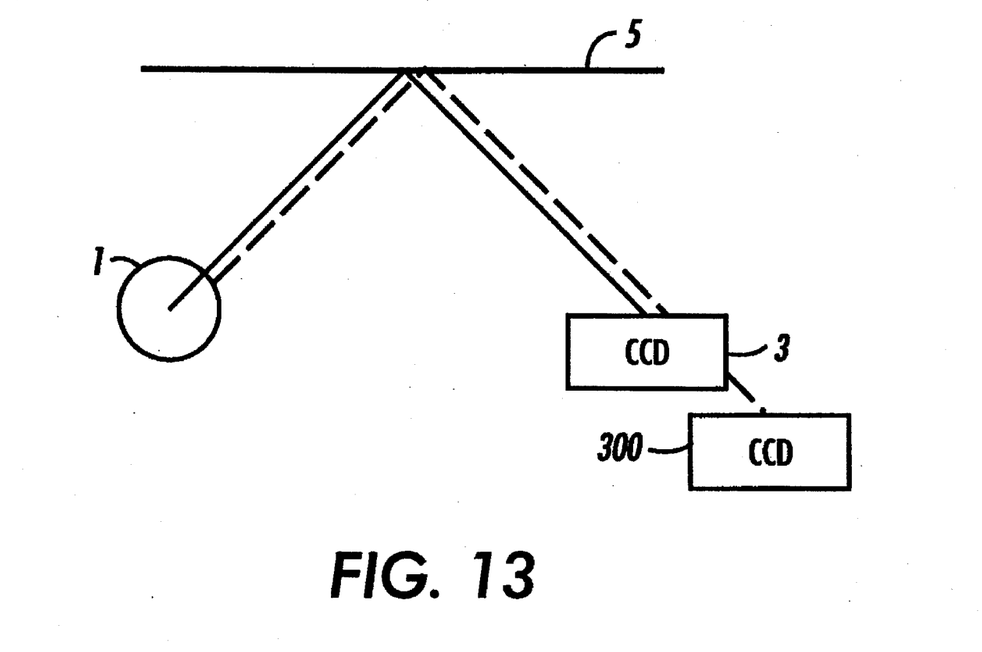
FIG. 13 is a block diagram illustrating a color scanner, according to a sixth embodiment of the present invention.

A third possibility is to use a second light source having different spectral emission characteristics from the light source used to acquire the first R, G, and B data (first scan) as illustrated in FIG. 12. As shown in FIG. 12, a second light source 100, having a different color characteristic from a first light source 1, is used to illuminate the image 5 so as to generate a second set of color data. This second light source may be used either separately from, or in combination with, the first light source. Likewise, a second image sensor with different filters could be used in place of the first image sensor as illustrated in FIG. 13. As shown in FIG. 13, a second CCD 300, which as an additional filter overlaying color filters that are identical to those found on a first CCD 3, is used to convert the light reflected from the image 5 to image data so as to generate a second set of color data.

Figure 9:
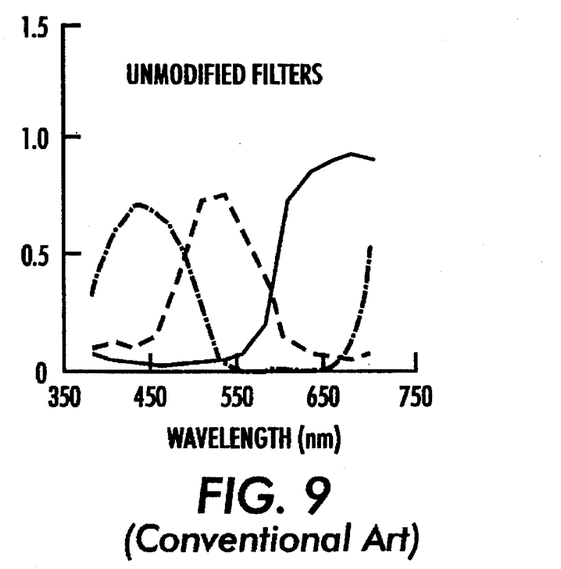
FIG. 9 is a graphical representation representing the spectral response of a conventional color scanner.

FIG. 9 illustrates the spectral response of a color scanner utilizing conventional RGB filters. Thus, the original scan carried out by the present invention produces a spectral response similar to that illustrated in FIG. 9 for the three colors, red, green, and blue (RGB).

Figure 10:
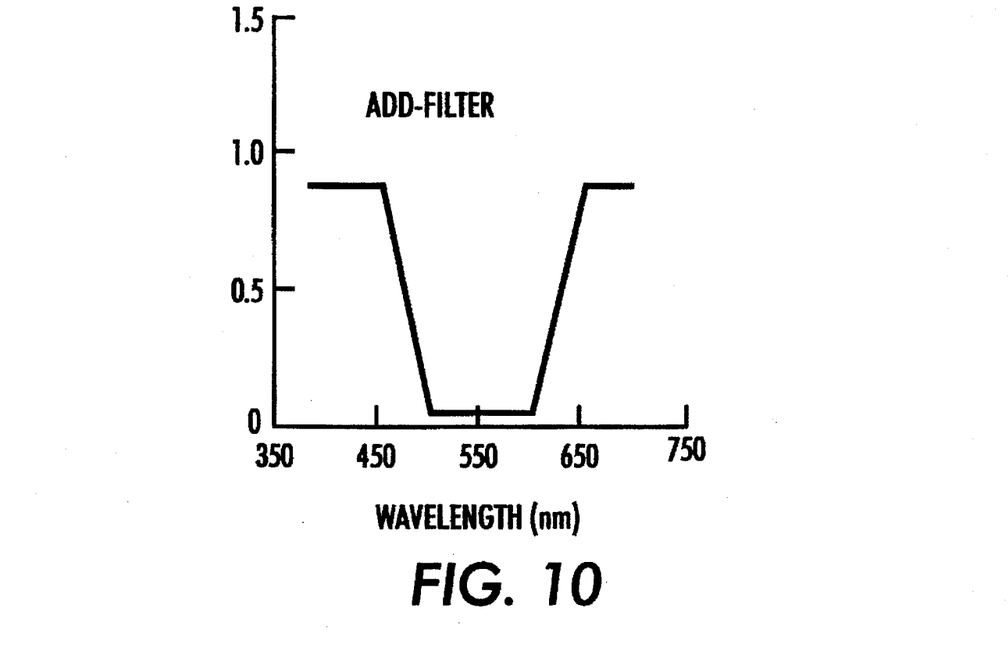
FIG. 10 is a graphical representation of a spectral response of an additional filter according to a preferred embodiment of the present invention.
Figure 11:
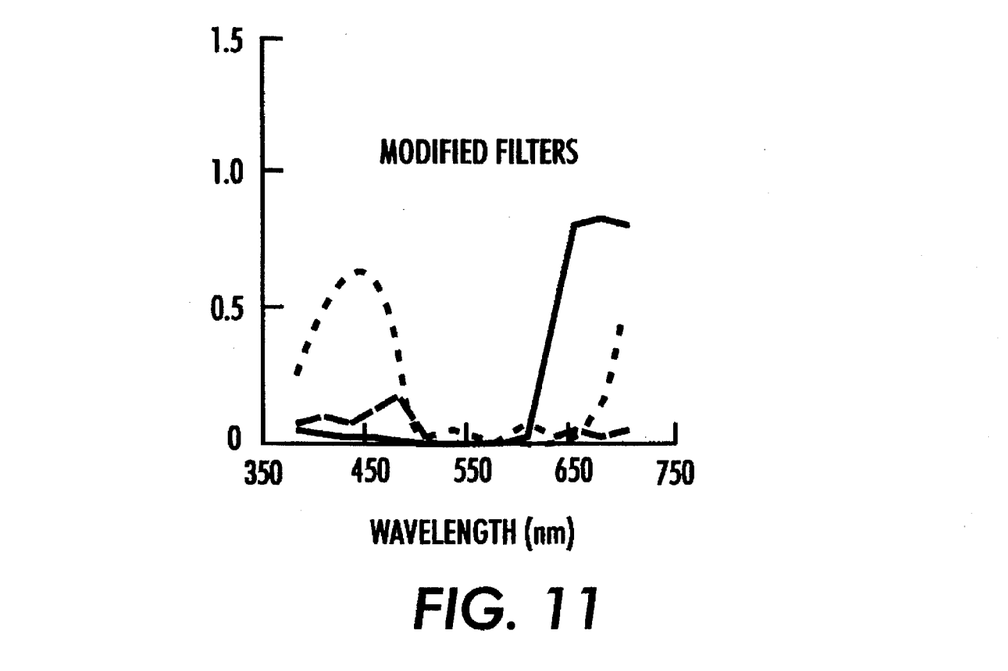
FIG. 11 is a graphical representation of the spectral response of the color scanner implementing the filter graphically illustrated in FIG. 10.

FIG. 10 illustrates the spectral response of a preferred additional filter utilized in the second scan of the color image. In the preferred embodiment of the present invention, this additional filter is a notch filter which only allows certain frequencies of light to pass therethrough. When this additional filter is placed in the optical path between the light source and the sensor along with the other three color filters, the spectral response of the color scanner looks like the spectral response illustrated in FIG. 11. Thus, the information received from the second scan can be utilized in conjunction with the information received from the first scan to compute the corrected color values so that the color scanner can more accurately create an electronic file that completely describes the color of an object as if seen by the human eye.

While the preferred embodiment of the present invention uses red, green, and blue filters for the initial scan and a notch filter, preferably a magenta type filter, for the additional scan, the present invention is not limited to this filter combination. For example, conventional color scanners sometimes employ cyan, magenta, and yellow filters to acquire the color image data needed to produce a color image reproduction. In such a case, an added bandpass filter, such as a green filter, could be used during an additional scan to acquire a second set a image data that would be used to compute corrected color image data. Other filter combinations are also possible.

In another embodiment of the present invention, the user is allowed to select the quality of the color reproduction. In this embodiment, the $k_1$–$k_9$ are designed to be the same in each case (single scan versus two scans) so that varying quality levels can be selected by the user.

For example, if the user desires a lower quality, a single scan can be made and the first set of equations are utilized to generate the corrected color values. However, if the user desires a higher quality, a second scan would be performed utilizing an additional filter such that a new set of coefficients $k_{10}$–$k_{18}$ are used. The two results would then be combined to generate more accurately corrected color values so as to provide a higher quality representation of the color image.

Since color correction is often performed in hardware that implements the first set of equations, the calibration scanning could be performed twice, once with the unmodified RGB and once with the modified R', G', B'. The data from each scan would be transformed according to the first set of equations and stored in electronic files. The desired XYZ files can then be obtained by a simple operation, such as adding the two files together.

The accuracy of the present invention could be improved further by utilizing additional color filters and additional scans, but the advantage of using additional color filters and scans would eventually be outweighed by the decrease in productivity of the color scanner.

Although the present invention has been described with respect to adding a filter in the optical path between the light source and the image sensor, the additional filter may be placed anywhere on the sensors, lens, lamp, or platen of the color scanner. More specifically, the important criteria for the additional filter is that the additional filter be placed somewhere in the optical path between the light source and the sensors or photosites. This may include the use of a second light source or a different sensor.

While the invention has been described with reference to various embodiments disclosed above, it is not limited to the details set forth above, but is intended to cover such modifications or changes as may come within the scope of the attached claims.

What is claimed is:

1. A method for performing a color scan, comprising the steps of:
    (a) scanning a color image utilizing a set of color filters, a source of illumination, and a photosensor;
    (b) generating a first set of color data from the execution of said step (a);
    (c) scanning the color image utilizing the set of color filters with an additional color filter inserted into an optical path between the source of illumination and the photosensor;
    (d) generating a second set of color data from the execution of said step (c); and
    (e) producing a set of corrected color values from the first and second set of color data.

2. The method as claimed in claim 1, wherein the additional color filter used in the scanning process of said step (c) is a notch filter.

3. The method as claimed in claim 1, wherein the set of color filters used in the scanning process of said steps (a) and (c) is a set of color filters positioned on a CCD sensor.

4. The method as claimed in claim 1, wherein the set of color filters used in the scanning process of said steps (a) and (c) is a set of color filters positioned on a full width array sensor.

5. The method as claimed in claim 1, wherein the corrected color values produced in said step (e) are computed in a scanner.

6. The method as claimed in claim 1, wherein the corrected color values produced in said step (e) are computed in a host computer.

7. A digital color scanning system, comprising:
    a light source;
    a photosensor;
    a first color filter;
    a second color filter;
    a third color filter; and
    a fourth color filter;
    said first, second, and third color filters being positioned in an optical path between said light source and said photosensor so as to enable said photosensor to produce a first, second, and third set of color image data during a first scan;
    said fourth color filter being moved into and out of the optical path between said light source and said photosensor so as to enable said photosensor to produce a fourth, fifth, and sixth set of color image data during a second scan.

8. The digital color scanner as claimed in claim 7, further comprising:
    means for producing a set of corrected color values from said first, second, third, fourth, fifth, and sixth sets of color image data.

9. The digital color scanner as claimed in claim 7, wherein said photosensor is a full width array and said first, second, and third color filters are formed on said full width array.

10. The digital color scanner as claimed in claim 7, wherein said first, second, and third color filters form a color wheel in the optical path between said light source and said photosensor.

11. The digital color scanner as claimed in claim 7, further comprising:
    means for sliding said first, second, and third color filters into and out of the optical path of said light sensor and said photosensor.

12. The digital color scanner as claimed in claim 7, wherein said fourth color filter is a notch filter.

13. A digital color scanner, comprising:
    a first light source;
    a second light source having a different spectral emission characteristic from said first light source;
    a photosensor;
    a first color filter;
    a second color filter; and
    a third color filter;
    said first, second, and third color filters being positioned in an optical path between said first light source and said photosensor so as to enable said photosensor to produce a first, second, and third set of color image data during a first scan of an image;
    said first, second, and third color filters being positioned in an optical path between said second light source and said photosensor so as to enable said photosensor to produce a fourth, fifth, and sixth set of color image data during a second scan of the image.

14. A digital color scanner, comprising:
    a light source;
    a first photosensor;
    a second photosensor;
    a first color filter;
    a second color filter; and
    a third color filter;
    said second photosensor having a fourth color filter formed thereon such that said second photosensor measures a spectral emission characteristic different from said first photosensor;
    said first, second, and third color filters being positioned in an optical path between said light source and said first photosensor so as to enable said first photosensor to produce a first, second, and third set of color image data during a first scan;
    said first, second, and third color filters being positioned in an optical path between said light source and said second photosensor so as to enable said second photosensor to produce a fourth, fifth, and sixth set of color image data during a second scan.

15. A digital color scanning system capable of changing color quality, comprising:
    a user interface for selecting a color quality;
    a light source;
    a photosensor;
    a first color filter;
    a second color filter;
    a third color filter; and
    a fourth color filter;
    said first, second, and third color filters being positioned in an optical path between said light source and said photosensor so as to enable said photosensor to produce a first, second, and third set of color image data during a first calibration scan;

said fourth color filter being moved into and out of the optical path between said light source and said photosensor so as to enable said photosensor to produce a fourth, fifth, and sixth set of color image data during a second calibration scan; and scanning means for producing a set of corrected color values from said first, second, third, fourth, fifth, and sixth sets of color image data.

16. The digital color scanner as claimed in claim 15, wherein said photosensor is a full width array and said first, second, and third color filters are formed on said full width array.

17. The digital color scanner as claimed in claim 15, wherein said first, second, and third color filters form a color wheel in the optical path between said light source and said photosensor.

18. The digital color scanner as claimed in claim 15, further comprising:

mechanic means for sliding said first, second, and third color filters into and out of the optical path of said light sensor and said photosensor.

19. The digital color scanner as claimed in claim 15, wherein said fourth color filter is a notch filter.

* * * * *